United States Patent [19]
Hiratsuka et al.

[11] Patent Number: 5,672,325
[45] Date of Patent: Sep. 30, 1997

[54] METHOD FOR THE OXIDATION TREATMENT OF DECABORANE GAS

[75] Inventors: Hajime Hiratsuka; Junichi Yagyu, both of Ibaraki-ken; Tetsuaki Marufuji; Kazunori Gotoda, both of Kanagawa-ken, all of Japan

[73] Assignees: Japan Atomic Energy Research Institute; Tomoe Shokai Co., Ltd., both of Tokyo, Japan

[21] Appl. No.: 590,912

[22] Filed: Jan. 24, 1996

[30] Foreign Application Priority Data

Jan. 24, 1995 [JP] Japan .................. 7-008721

[51] Int. Cl.$^6$ .................................. B01D 53/46
[52] U.S. Cl. ..................... 423/210; 376/133; 376/146
[58] Field of Search .................. 423/210; 376/133, 376/146

[56] References Cited

U.S. PATENT DOCUMENTS

| | | | |
|---|---|---|---|
| 4,743,435 | 5/1988 | Kitahara et al. | 423/210 |
| 4,996,030 | 2/1991 | Kitahara et al. | 423/210 |

FOREIGN PATENT DOCUMENTS

| | | | |
|---|---|---|---|
| 62-95119 | 5/1987 | Japan | 423/210 |
| 3-137917 | 6/1991 | Japan | 423/210 |

OTHER PUBLICATIONS

Fusion Engineering and Design, vol. 22, 1993, pp. 277–278.

M. Saidoh, H. Hiratsuka, T. Arai, Y. Neyatani, M. Shimada and T. Koike, Fusion Engineering and Design, "A boronization system in the JT–60U tokamak: Application of a new method using a less hazardous substance", vol. 22, 1993, pp. 271–275.

*Primary Examiner*—Michael Lewis
*Assistant Examiner*—Peter DiMauro
*Attorney, Agent, or Firm*—Banner & Witcoff, Ltd.

[57] ABSTRACT

The unwanted or unreacted decaborane gas that results from a boronizing operation using decaborane which is solid at ordinary temperatures but which is heated to a gaseous phase for injection into a vacuum vessel is passed through a metal tube packed with the granules of an alkaline oxidizing agent consisting of potassium permanganate and potassium hydroxide, whereby the decaborane gas is oxidized to solid and gaseous stable substances including manganese compounds and hydrogen. This provides an effective method for removing boron from the boron-containing exhaust gases that result from the coating of the inner surfaces of vacuum vessels in nuclear fusion reactors with an evaporated boron film.

2 Claims, 4 Drawing Sheets

METHOD FOR THE OXIDATION TREATMENT OF DECABORANE GAS

BACKGROUND OF THE INVENTION

1. Field of the Invention

This invention relates to a method for the oxidation treatment of decaborane gas. More specifically, the invention relates to a boronizing treatment as a boron coating technique.

Nuclear fusion reactors have the vacuum vessel boronized on the inner surfaces to provide evaporated boron coatings. For boronization, decaborane (a kind of boron hydride compounds) which is solid and easy to handle at ordinary temperatures is heated to a gaseous phase, which is injected into the vacuum vessel and decomposed by glow discharge. The unreacted or no longer necessary decaborane gas is discharged via an evacuator and carried by nitrogen or some other gas to be passed through a stainless steel tube packed with the granules of an oxidizing agent consisting of potassium permanganate and potassium hydroxide, where the decaborane gas is oxidized to manganese compounds (e.g., manganese oxide) and other stable substances such as potassium borate, water and hydrogen so that the contents of the unreacted decaborane gas and the no longer necessary decaborane gas in the exhaust gas are reduced to below the threshold limit values (TLV) which represent the permissible levels for prolonged exposure.

2. Prior Art

To provide boron coatings, diborane and other boron hydride compounds (i.e., gaseous chemical materials) are supplied at constant pressure to vacuum vessels and the like and subjected to either glow discharge or chemical vapor deposition (CVD). The unreacted and no longer necessary gases are discharged from a dedicated evacuator system for treatment by such methods as dilution with an inert gas (e.g., $N_2$), scrubbing with an injected processing agent, combustion and physical adsorption.

With the recent advances in the boron coating technology which involves glow discharge or CVD (thin-film formation), the exhaust gases are rarely discharged in the as-supplied gaseous state but more often contain increasing amounts of the particles of highly active chemical species (e.g., excited atoms, molecules and reaction products). Such exhaust gases cannot be completely treated by dilution with an inert gas, scrubbing with an injected processing agent, combustion or physical adsorption and, alternatively, chemical adsorption is employed to remove the unwanted chemical species, thereby providing clean exhaust gases.

In the chemical adsorption method, a processing agent mainly composed of an oxidizer is reacted with the gas of a chemical material of interest so that it is oxidized to a stable form. The major chemical materials that can be treated by this method include those which occur in the gaseous phase at ordinary temperatures, such as diborane ($B_2H_6$), silane ($SiH_4$), phosphine ($PH_3$), arsine ($AsH_3$), hydrogen selenide ($H_2Se$), hydrogen tetrafluoride ($SiF_4$), boron trifluoride ($BF_3$), hydrogen fluoride (HF), silicon tetrachloride ($SiCl_4$), hydrogen sulfide ($H_2S$), hydrogen chloride (HCl), chlorine ($Cl_2$), boron trichloride ($BCl_3$), dichlorosilane ($SiH_2Cl_2$) and fluorine ($F_2$). On the other hand, decaborane is solid at ordinary temperatures and there have been available no facilities that permit the use of decaborane either in the solid state or as a gaseous form that has been provided by volatilization under heating. Hence, no practical method has been established that can treat the decaborane gas and in the absence of a suitable agent and an apparatus for treating the exhaust gases, no technology has been available for the safe treatment of the decaborane gas.

SUMMARY OF THE INVENTION

Decaborane and diborane are both within the class of boron hydrides and one molecule of decaborane is equivalent to five molecules of diborane. Hence, decaborane defies a safe treatment by dilution with an inert gas (e.g., $N_2$), scrubbing with an injected processing agent, combustion or physical adsorption.

An object, therefore, of the invention is to treat the decaborane gas, boron reaction products and other highly active particulate materials by chemical adsorption such that they are converted to safe and stable substances, whereby the concentrations of exhaust gases that result from boron coating and other thin-film forming operations by glow discharge and plasma-assisted CVD using decaborane are sufficiently reduced to provide clean emissions.

Another object of the invention is to ensure that the process of chemical adsorption can be controlled with the profile of involved reactions being monitored for such purposes as checking the life expectancy of the apparatus for treatment.

DETAILED DESCRIPTION OF THE INVENTION

Figure 1:
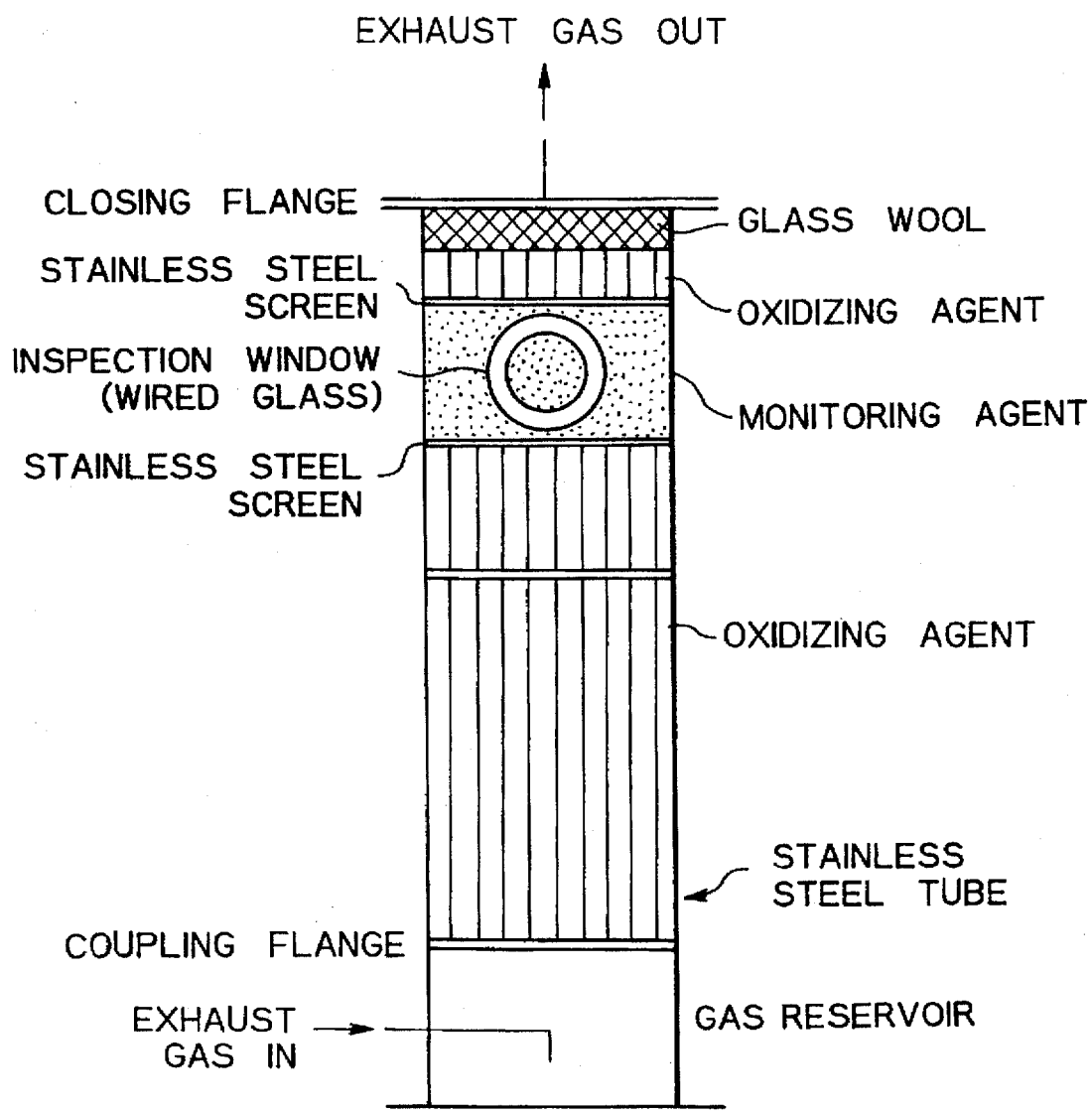
FIG. 1 shows a stainless steel tube as it is packed with an oxidizing agent and any other substances required to perform oxidation treatment on decaborane gas.

To attain the stated objects of the present invention, a stainless steel tube is packed with the granules of an oxidizing agent consisting of potassium permanganate (main oxidizer) and potassium hydroxide (reaction accelerator) in such a way as to provide good gas permeability and, in order to check the progress of oxidative reaction between the decaborane gas and the oxidizing agent, a granular monitoring agent mainly composed of copper sulfate is also packed in the stainless steel tube but partitioned from the oxidizing agent by means of a stainless steel screen and the progress of oxidative reaction of the decaborane gas is monitored by watching the changing color of the monitoring agent through an inspection window.

To insulate the heat of reaction between the oxidizing agent and the decaborane gas, the greater part of the oxidizing agent is covered with the stainless steel tube so that it cannot be seen through the inspection window. The stainless steel tube is first packed with part of the oxidizing agent, then with the monitoring agent and finally with the remaining part of the oxidizing agent, in such a manner as to enable prediction as to how much time is left for the treatment of the exhaust gases resulting from boronizing to be complete; what is more, the packing order is determined in such a way that the inability of the reaction to be effected in one step is deliberately used to check the residual amount of the oxidizing agent such that the treatment system can be brought to a safe shutdown.

The exhaust gases ascend the stainless steel tube as they are progressively reacted with the oxidizing agent to Generate stable compounds such as manganese compounds (e.g., manganese oxide) and potassium borate through the oxidative reaction. Stable gaseous substances (e.g., $H_2$) will also form and pass through the stainless steel tube to be safely discharged into the atmosphere.

Thus, according to the method of the present invention for the oxidation treatment of decaborane gas, the oxidizing agent consisting of potassium permanganate and potassium hydroxide are packed into the stainless steel tube in such a way that they will not intermingle with the monitoring copper sulfate and decaborane and other exhaust gases are passed through the layers of the packing materials, whereby the exhaust gases are oxidized to manganese compounds and other stable substances.

Stated more specifically, in order to insure safe treatment of the decaborane gas that remains unreacted or that is no longer necessary for boronizing, these gases are directed into a stainless steel tube which is connected to the exit ends of pumps and other evacuating means and which is packed with the oxidizing agent and the monitoring agent both of which are in a granular form to provide good gas permeability and the gases are chemically reacted with the oxidizing agent to be oxidized to stable compounds such as manganese oxide and potassium borate while, at the same time, they are converted to stable gases such as hydrogen gas for discharge into the atmosphere. The oxidizing agent in the stainless steel tube generates heat upon reaction with the decaborane gas and it may be partitioned from the monitoring agent to allow for treatments in the stainless steel tube having high resistance to heat and corrosion.

By watching the changing color of the monitoring agent packed in the stainless steel tube at the site where the inspection window is provided, the profile of the treatment of the decaborane gas with the oxidizing agent can be monitored as a function of the progress of oxidation of the ascending decaborane gas, which is a measure of the time where the oxidizing agent is to be replaced by a fresh one.

Embodiments of the process of the invention for oxidation treatment of decaborane gas will now be described with specific reference to the accompanying drawings.

Conventionally, gases to be removed have been treated by dilution with inert gases (e.g., $N_2$), scrubbing with injected processing agents, combustion and physical adsorption. However, the particles of highly active chemical species such as decaborane gas cannot be effectively treated by these methods to produce clean exhaust gases. According to the invention, such particles of highly active materials are treated by chemical adsorption (oxidation) to produce clean exhaust gases.

FIG. 1 is a schematic representation of a stainless steel tube as it is packed with an oxidizing agent and any other substances required to perform oxidation treatment on decaborane gas. As shown, the stainless steel tube has a gas reservoir in the bottom and a closing flange on the top. Packed in between are part of the oxidizing agent, a monitoring agent, the remainder of the oxidizing agent and a mass of glass wool. A stainless steel screen is provided in three positions, the first for separating the gas reservoir from part of the oxidizing agent, the second for isolating said part of the oxidizing agent from the monitoring agent, and the third for isolating the monitoring agent from the remainder of the oxidizing agent. The mass of glass wool is provided for ensuring against runaway of the oxidizing agent. In the case shown in FIG. 1, decaborane gas and other emissions from processes such as boronizing enter the gas reservoir through an inlet at the bottom of the stainless steel tube and ascends (the decaborane gas has a specific gravity less than unity) the tube by sequentially passing through the first stainless steel screen, the first part of the oxidizing agent, the second stainless steel screen, the monitoring agent, the third stainless steel screen, the second part of the oxidizing agent and the glass wool and thereafter leaves the stainless steel tube via an exhaust gas outlet. The closing flange on the top of the stainless steel tube permits a fresh oxidizing agent to be loaded in the tube from above while a spent oxidizing agent can be disposed of as a waste. Additionally, in order to ensure that the amount of the oxidizing agent is variable with the volume of the decaborane gas to be treated, two or more units of the stainless steel tube can be interconnected by means of coupling flanges.

Figure 2:
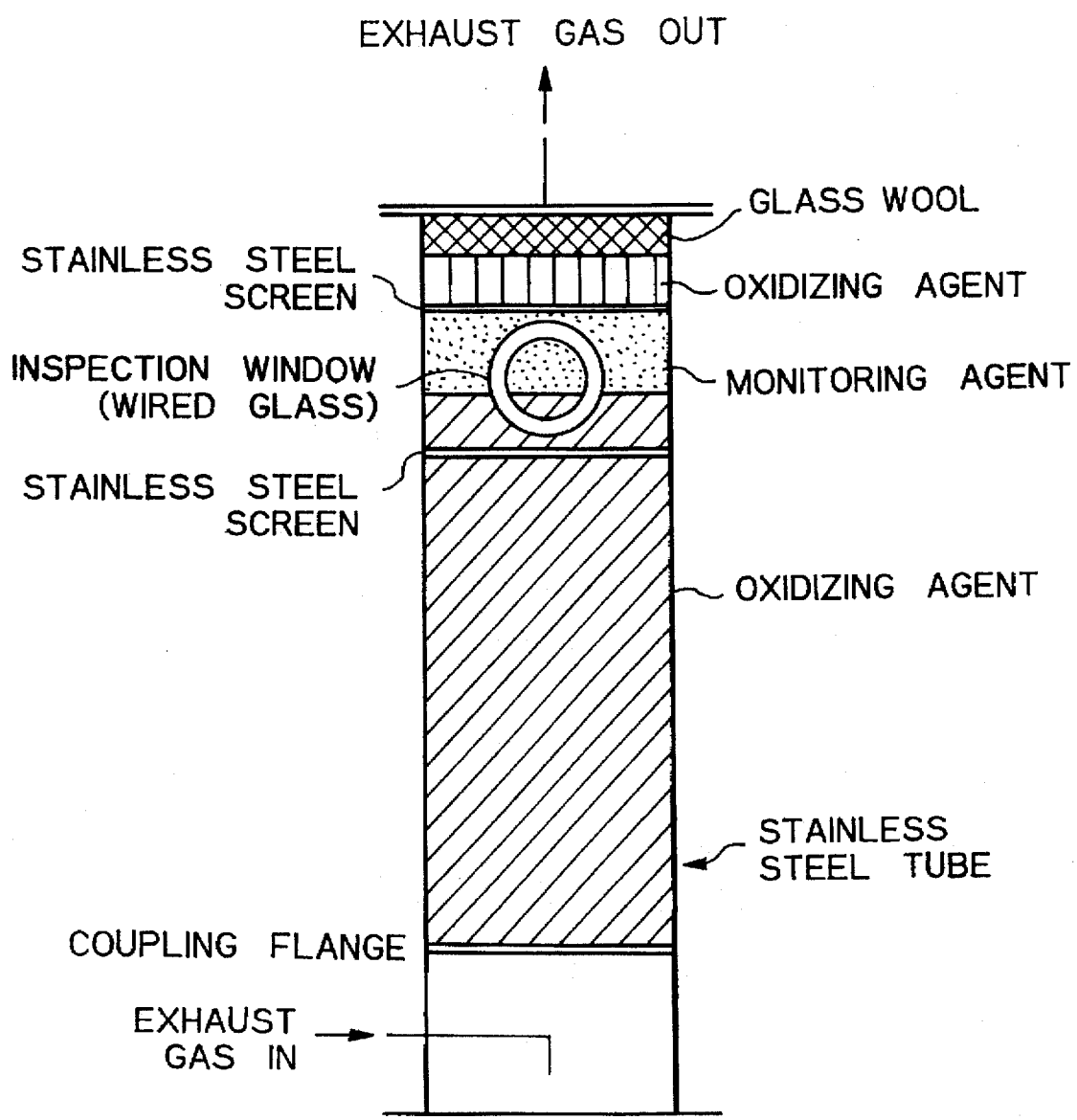
FIG. 2 shows how the stainless steel of FIG. 1 looks like if the decaborane gas is subjected to oxidation treatment with the packed oxidizing agent.

FIG. 2 shows how the stainless steel tube looks like if decaborane gas is subjected to oxidation treatment with the packed oxidizing agent. The decaborane gas entering the stainless steel tube packed with the oxidizing agent undergoes an oxidative reaction with the latter to be converted not only to solid and stable substances such as manganese compounds but also to gaseous and stable substances such as hydrogen. The gaseous substances produced are passed through the spaces between individual granules of the oxidizing agent to be discharged from the stainless steel tube via the outlet on the top. The oxidative reaction progresses from bottom to top and if the oxidizing agent is no longer capable of treating the supplied decaborane gas, its oxidizing ability is saturated and manganese compounds and other stable substances will simply build up. If the ability of the oxidizing agent is saturated, the monitoring agent reacts with the decaborane gas and the resulting change in color will provide a visual signal for the time at which the oxidizing agent is to be replaced.

The progress of the oxidative reaction can be monitored by looking through the inspection window. Even if the ability of the oxidizing agent drops, the boronizing treatment under progress cannot be brought to an immediate stop; alternatively, the exhaust decaborane gas is treated with the oxidizing agent lying above the monitoring agent until the treatment system is brought to safe shutdown.

The decaborane gas ($B_{10}H_{14}$) reacts with the oxidizing agent (consisting of potassium permanganate $KMnO_4$ and potassium hydroxide $KOH$) according to the following schemes:

$$B_{10}H_{14} + 6K_2MnO_4 + 10K_3BO_3 + 6H_2O + 19H_2 \qquad (1)$$

$$2B_{10}H_{14} + 30K_2MnO_4 + H_2 \rightarrow 15Mn_2O_3 + 20K_3BO_3 + 15H_2O \qquad (2)$$

Thus, the reaction between the decaborane gas and the oxidizing agent proceeds in two different ways, yielding different intermediates. The oxidized decaborane gas is eventually converted to stable substances, i.e., manganese oxide ($Mn_2O_3$), potassium borate ($K_3BO_3$), water ($H_2O$) and hydrogen ($H_2$), in accordance with the following scheme:

$$7B_{10}H_{14} + 30KMnO_4 + 18OKOH \rightarrow 15Mn_2O_3 + 70K_3BO_3 + 45H_2O + 94H_2 \qquad (3)$$

The copper sulfate ($CuSO_4$) used as the monitoring agent typically assumes a pale blue color and turns to brown upon reaction with the decaborane gas.

Figure 3:
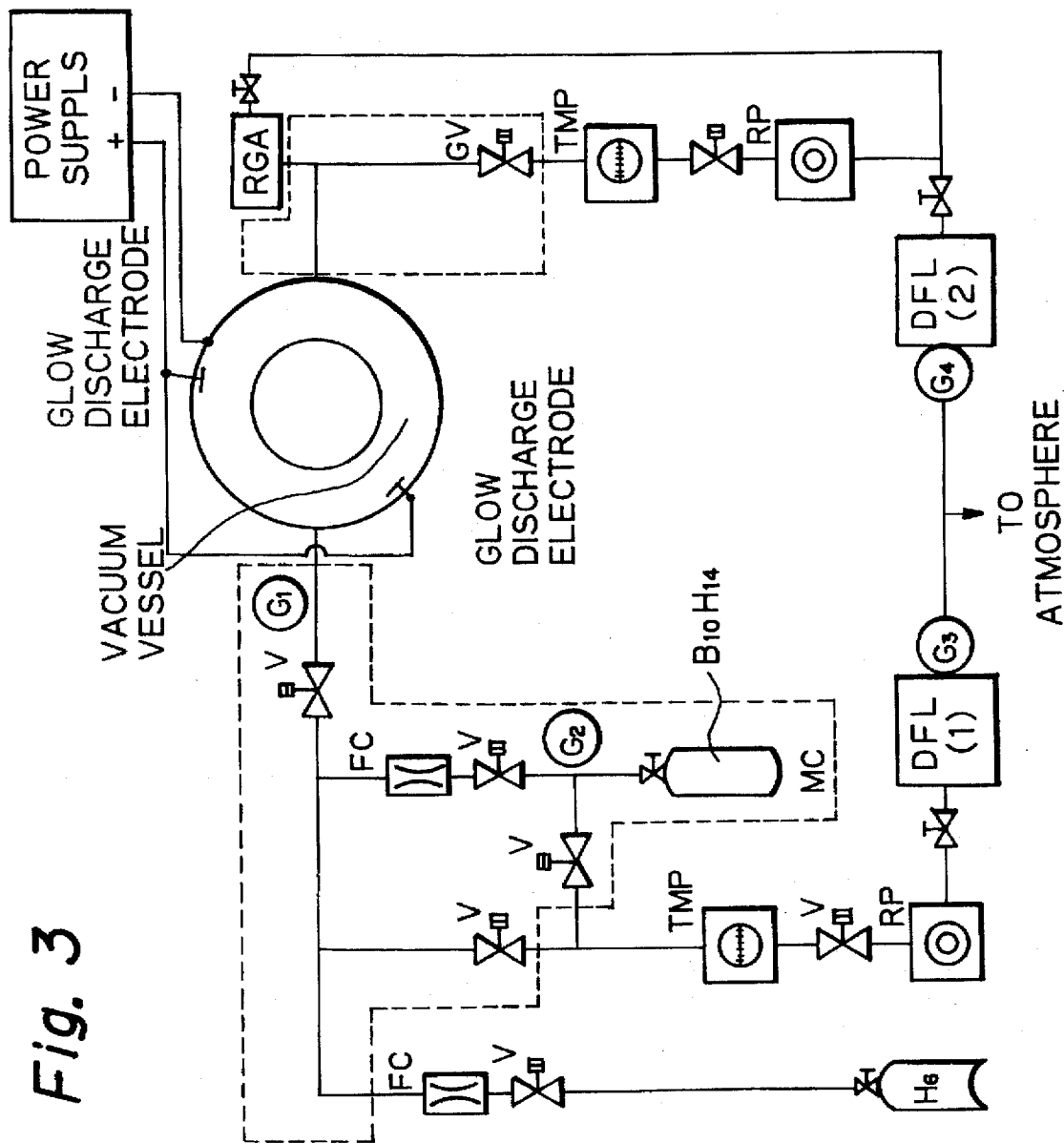
FIG. 3 is a flowsheet for the process of oxidation treatment of decaborane gas in which a stainless steel tube packed with an oxidizing agent and any other necessary substances is used as a decontamination factor limiter in the boronizing system.

FIG. 3 is a flowsheet for the method of the invention for the oxidation treatment of decaborane gas in which the stainless steel tube packed with an oxidizing agent and any other necessary substances is used as a decontamination factor limiter in the boronizing system. As shown, the boronizing system consists of a decaborane gas feed line and a waste decaborane gas discharge line; the feed line comprises a materials container MC, mass flow controllers FC, gate valves GV, pneumatic valves V, a turbomolecular pump TMP, a rotary pump RP, a first decontamination factor limiter DFL and other components, whereas the discharge line comprises gate valves, pneumatic valves, a turbomolecular pump, a rotary pump, a second decontamination factor limiter and other components. Shown by RGA is a quadrupole mass analyzer used as a residual gas analyzer and $G_1$–$G_4$ are gas leakage detectors. The areas enclosed with dashed lines represent the regions to be heated.

Boronizing is a process in which helium and decaborane gases are supplied from the decaborane gas feed line to be injected into the vacuum vessels equipped with glow discharge electrodes, where it is decomposed by glow discharge to provide a boron coat. As a result, the unreacted decaborane gas is rejected from the dedicated discharge line whereas the unwanted decaborane gas which has occurred is due to the stop of feed injection into the vacuum vessel rejected from the feed line. Both gases are harmful and discharged into the atmosphere after being treated to a safe form by the associated decontamination factor limiters.

Figure 4:
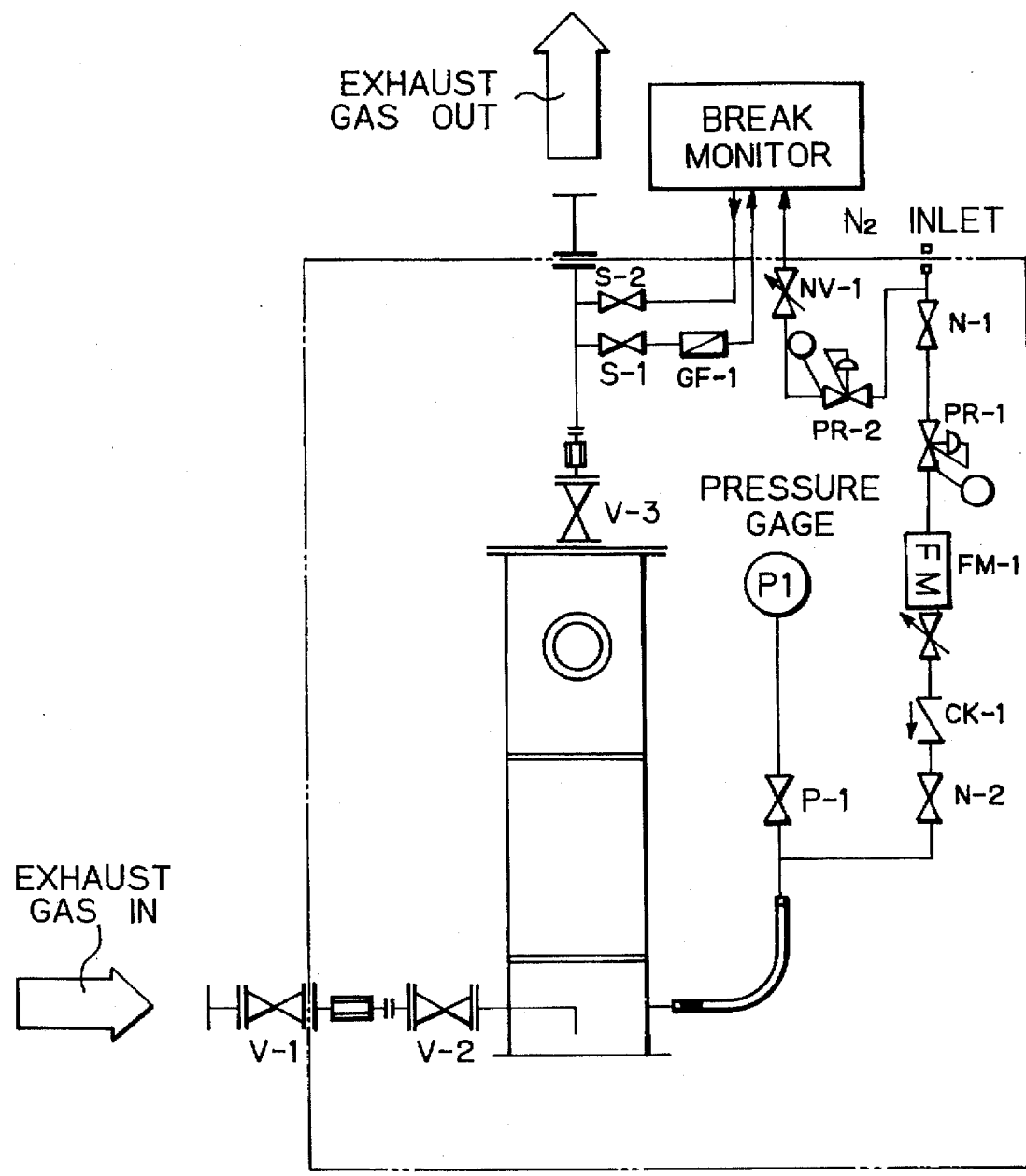
FIG. 4 is a flowsheet of a decontamination factor limiter for use in the oxidation treatment of decaborane gas, which is such that a stainless steel tube packed with an oxidizing agent and any other necessary substances is combined with a break monitor that uses nitrogen as a carrier gas and which monitors (checks) the concentrations of exhaust gases by a diaphragm electrode method.

FIG. 4 is a flowsheet of a decontamination factor limiter for use in the oxidation treatment of decaborane gas according to the present invention, which is such that a stainless steel tube packed with an oxidizing agent and any other necessary substances is combined with a break monitor that uses nitrogen gas as a carrier gas and which monitors (checks) the concentrations of exhaust gases by a diaphragm electrode method. The symbols in FIG. 4 denote the following: V-1, a first inlet valve for the exhaust gas; V-2, a second inlet valve for the exhaust gas; V-3, the outlet valve for the treated gas; P-1, the main valve on a pressure gage; P1, the pressure gage; N-1, a first inlet valve for nitrogen gas; N-2, a second inlet valve for nitrogen gas; CK-1, a check valve; PR-1, a first pressure release valve; FM-1, a flow meter; PR-2, a second pressure release valve; NV-1, a nitrogen flow control valve; S-1, an inlet valve to the break monitor; S-2, an outlet valve from the break monitor; and GF-1, a gas filter. The decontamination factor limiter pumps a specified volume or pressure of nitrogen gas into both the break monitor and the stainless steel tube packed with the oxidizing agent and the decaborane gas entering the stainless steel tube via the exhaust gas inlet reacts with the oxidizing agent and the oxidized gaseous emissions are drawn into the break monitor together with nitrogen gas and compared with the pumped nitrogen gas to detect the concentration of the decaborane gas. If the detected value is abnormal (greater than the TLV), the break monitor delivers an alarm signal. After the comparison, the gaseous emissions will be discharged from the exhaust gas outlet. When not in operation and during the storage of the materials to be reacted, the system shown in FIG. 4 can be sealed by closing the valves at the inlet and outlet for the exhaust gas.

As described above in detail, the method of the present invention for the oxidation treatment of decaborane gas ensures that the decaborane gas resulting from a boron coating operation using decaborane is passed through a stainless steel tube packed with an oxidizing agent consisting of potassium permanganate and potassium hydroxide, whereby the decaborane gas is chemically reacted with the oxidizing agent such that it is oxidized to safe solid or gaseous substances. If an inspection window is provided in the stainless steel tube, the progress of the oxidative reaction can be monitored by looking through the window and this enables the operator to know the right time at which the oxidizing agent should be replaced. What is more, the solid and gaseous substances resulting from the oxidation treatment are stable enough to allow for safe disposal as wastes.

The applicability of the invention is by no means limited to decaborane gas and it would be applicable to other boron hydrides in a gaseous state.

What is claimed is:

1. A method for oxidation treatment of decaborane gas exhausted from a boron coating of the inner surfaces of vacuum vessels in nuclear fusion reactors comprising passing decaborane gas through a metal tube packed with granules of an alkaline oxidizing agent and granules of a monitoring agent, thereby oxidizing said decaborane gas to stable substances consisting essentially of manganese oxide, potassium borate, water and hydrogen;

wherein the alkaline oxidizing agent comprises potassium permanganate and potassium hydroxide, and the monitoring agent comprises copper sulfate;

wherein the metal tube is packed in three layers in the order of a first layer comprising the granules of the oxidizing agent, a second layer comprising the granules of the monitoring agent, and a third layer comprising the granules of the oxidizing agent, whereby the second layer is partitioned from the first layer and from the third layer by means of stainless steel screens;

wherein the decaborane gas is passed through the layers in order from the first layer to the third layer; and wherein an inspection window is provided in the metal tube positioned next to the second layer in order to monitor the progress of the oxidative reaction of the decaborane gas by watching the color change of the monitoring agent.

2. A method according to claim 1, wherein the decaborane gas to be treated is a mixture of unwanted and unreacted decaborane gas that results from a botanizing operation using decaborane which is heated to a gas phase for injection into the vacuum vessel.

* * * * *